United States Patent [19]
Locht

[11] Patent Number: 5,982,267
[45] Date of Patent: Nov. 9, 1999

[54] FUSE HOLDER FOR DISTRIBUTION TRANSFORMERS

[75] Inventor: Guillermo Locht, Selmer, Tenn.

[73] Assignee: General Electric Company, Schenectady, N.Y.

[21] Appl. No.: 09/238,449

[22] Filed: Jan. 28, 1999

[51] Int. Cl.⁶ .......................... H01H 85/02; H01H 85/54; H02B 1/26; H02B 1/04
[52] U.S. Cl. .......................... 337/186; 337/187; 361/626; 361/642
[58] Field of Search ...................................... 337/186, 187, 337/188, 189, 283; 361/626, 642, 646, 833, 835, 837

[56] References Cited

U.S. PATENT DOCUMENTS

| | | | |
|---|---|---|---|
| 737,283 | 8/1903 | Sachs | 361/833 |
| 1,510,350 | 9/1924 | Thomas | 361/646 |
| 3,576,509 | 4/1971 | Bernatt | 337/8 |
| 3,868,617 | 2/1975 | Dragon et al. | 337/203 |
| 3,916,258 | 10/1975 | Westrom | 317/15 |
| 3,916,259 | 10/1975 | Russell et al. | 317/15 |
| 3,916,260 | 10/1975 | Westrom et al. | 317/15 |
| 3,991,348 | 11/1976 | Evans | 317/114 |
| 4,010,437 | 3/1977 | Macemon et al. . | |
| 4,146,862 | 3/1979 | Mikulecky . | |
| 4,194,806 | 3/1980 | Macemon . | |
| 4,233,643 | 11/1980 | Iverson et al. | 361/344 |
| 4,257,662 | 3/1981 | Motten, Jr. | 339/186 R |
| 4,808,963 | 2/1989 | Stunzi et al. . | |
| 5,576,682 | 11/1996 | Fisher et al. . | |
| 5,655,292 | 8/1997 | Fisher et al. . | |

FOREIGN PATENT DOCUMENTS

| | | | |
|---|---|---|---|
| 405159693 | 6/1993 | Japan | H01H 85/56 |
| 407201269 | 8/1995 | Japan | H01H 85/56 |
| 409245611 | 9/1997 | Japan | H01H 85/56 |

OTHER PUBLICATIONS

Cooper Power Systems Catalog sheets on "ELSP Fuse Holder"; pp. 1–2; Jan., 1990; Model No. 240–53.

*Primary Examiner*—Leo P. Picard
*Assistant Examiner*—Anatoly Vortman
*Attorney, Agent, or Firm*—Carl B. Horton; Cantor Colburn LLP

[57] ABSTRACT

The present invention provides a fuse holder for supporting a plurality of fuses for electrical distribution equipment such as a distribution transformer. The fuse holder comprises a first end plate attached to a first distal end of the fuses; and a second end plate attached to a second distal end of the fuses. The first and second end plates have a plurality of relief cuts to permit an increased surface creep distance and are constructed of an electrically non-conductive material. A top plate, having wire routing openings for retaining wire bundles of the electrical distribution equipment, is attached to the top of the first and second end plates.

10 Claims, 2 Drawing Sheets

FUSE HOLDER FOR DISTRIBUTION TRANSFORMERS

BACKGROUND OF THE INVENTION

The present invention relates generally to a fuse holder for electrical distribution equipment. More specifically the present invention relates to a fuse holder for supporting fuses electrically connected to a distribution transformer.

Distribution transformers are utilized to step voltage levels up or down in electrical power distribution systems. Stepping up the voltage levels of the electrical power reduces the current required to carry that power and minimizes line losses. However, a great deal of heat is emitted when the power passes through the transformers, therefore the transformers are often cooled by being immersed in containers filled with a cooling liquid such as oil. This is especially true when high power is involved, e.g., when the transformers are located near the power source.

Electrically connected to the transformers are fuses which provide various forms of current protection, e.g., over current protection, current limiting protection, and energy limiting protection, for the distribution transformers and the distribution system as a whole. Fuse holders are utilized for supporting these fuses. The fuses and fuse holders are often mounted to the distribution transformers themselves and immersed in the same cooling liquid.

However, fuse holders for distribution transformers generally contain a large number of bulky parts, and are therefore costly to assemble and difficult to manufacture to desired quality standards. Moreover, these fuse holders do not have a standard design. Many different types of fuse holders are utilized to accommodate the various fuses connected to the distribution transformers.

Additionally, the cooling oil presents a harsh environment to the fuses and fuse holders. This oil is subject to extreme temperature ranges, e.g., from −30 degrees centigrade to 140 degrees centigrade. Therefore expansion and contraction of the fuses and fuse holders must be taken into account in order to maintain a safe distance between fuses. However, this adds to the undesirable size, complexity, and variety of the fuse holders.

Additionally adding to the size of the fuse holders is the requirement to maintain a proper creep distance between the fuses. In high voltage multiphase situations, e.g., fuses electrically connected to the three phases of a distribution transformer, a significant voltage differential will develop between the ends of the fuses protecting each phase. This voltage differential will cause a current (creep current) to conduct between the ends of the fuses mounted on a fuse holder if the fuses are not positioned a safe distance (creep distance) apart. The requirement to maintain a safe creep distance between each fuse mounted on a fuse holder significantly increases the overall size of the fuse holder even if the fuse holder is comprised of nonconductive material.

Furthermore, the containers into which the fuses, fuse holders and transformers are immersed have a limited capacity, and the wire cables used in the installation of this type of equipment are bulky. Therefore, wire routing around the fuse holders is difficult in the limited space available.

BRIEF SUMMARY OF THE INVENTION

The present invention provides a fuse holder for supporting a plurality of fuses for electrical distribution equipment. The fuse holder comprises a first end plate attached to a first distal end of the fuses; and a second end plate attached to a second distal end of the fuses. The first and second end plates have a plurality of relief cuts to increase surface creep distance for electrical purposes.

BRIEF DESCRIPTION OF THE DRAWINGS

Referring now to the drawings wherein like elements are numbered alike in the several Figures.

DETAILED DESCRIPTION OF THE INVENTION

Figure 1:
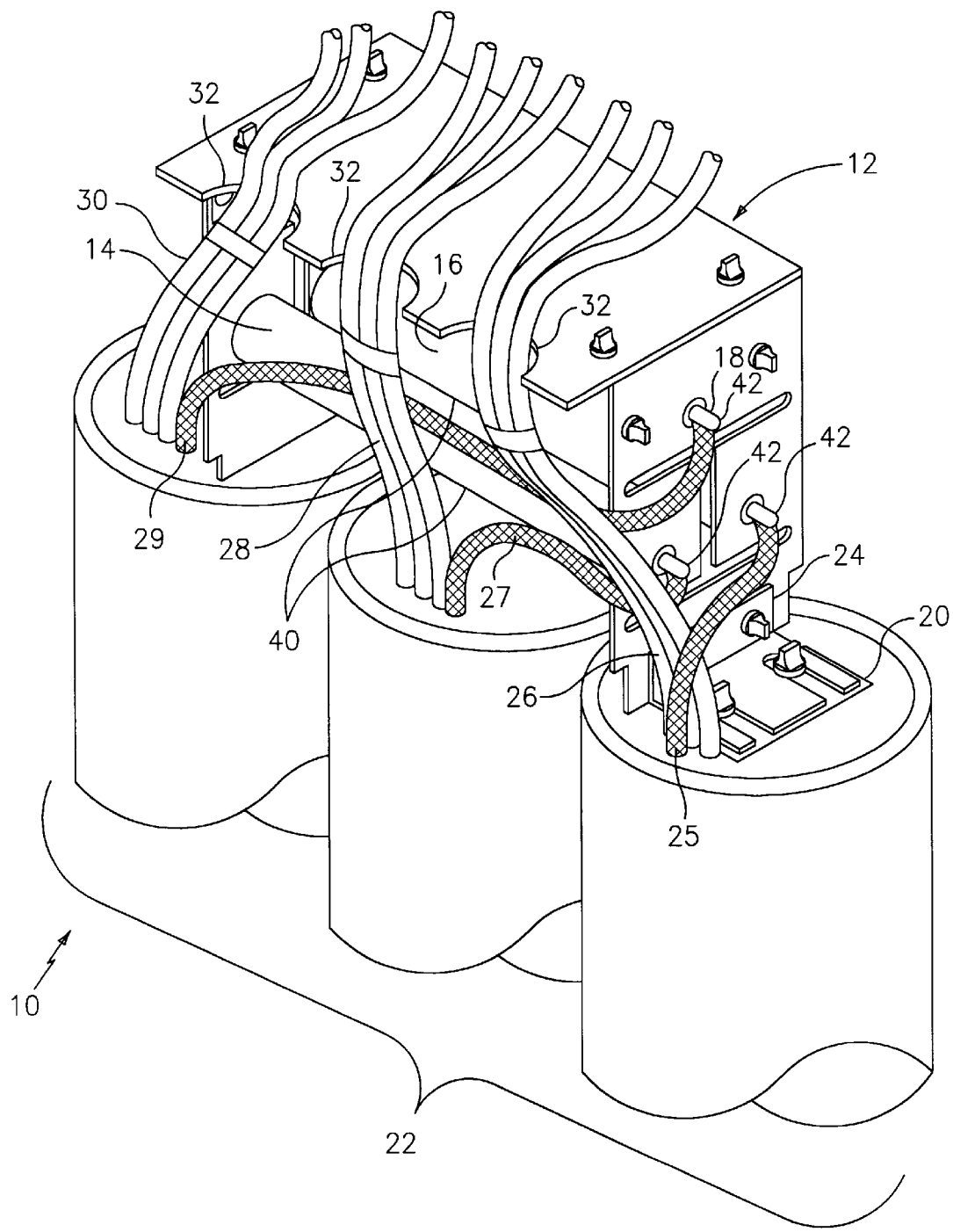
FIG. 1 is a perspective view of a fuse holder embodying the present invention shown mounted to a distribution transformer assembly.

Referring to FIG. 1, an exemplary embodiment of a distribution transformer assembly is shown generally at 10. The distribution transformer assembly comprises fuse holder 12, fuses 14, 16 and 18, and distribution transformer 22. Fuse holder 12 is mounted to top clamps of interior clamping assemblies 20 of distribution transformer 22 via pair of fuse holder mounting brackets 24. The fuse holder 12 supports fuses 14, 16 and 18 respectively. Each fuse 14, 16 and 18 have a generally cylindrically shaped body, and a pair of threaded distal ends 42 which are smaller in diameter than the outside diameter 40 of the body. Wires 25, 27 and 29, extending from distribution transformer 22, are bolted to threaded distal ends 42.

Figure 2:
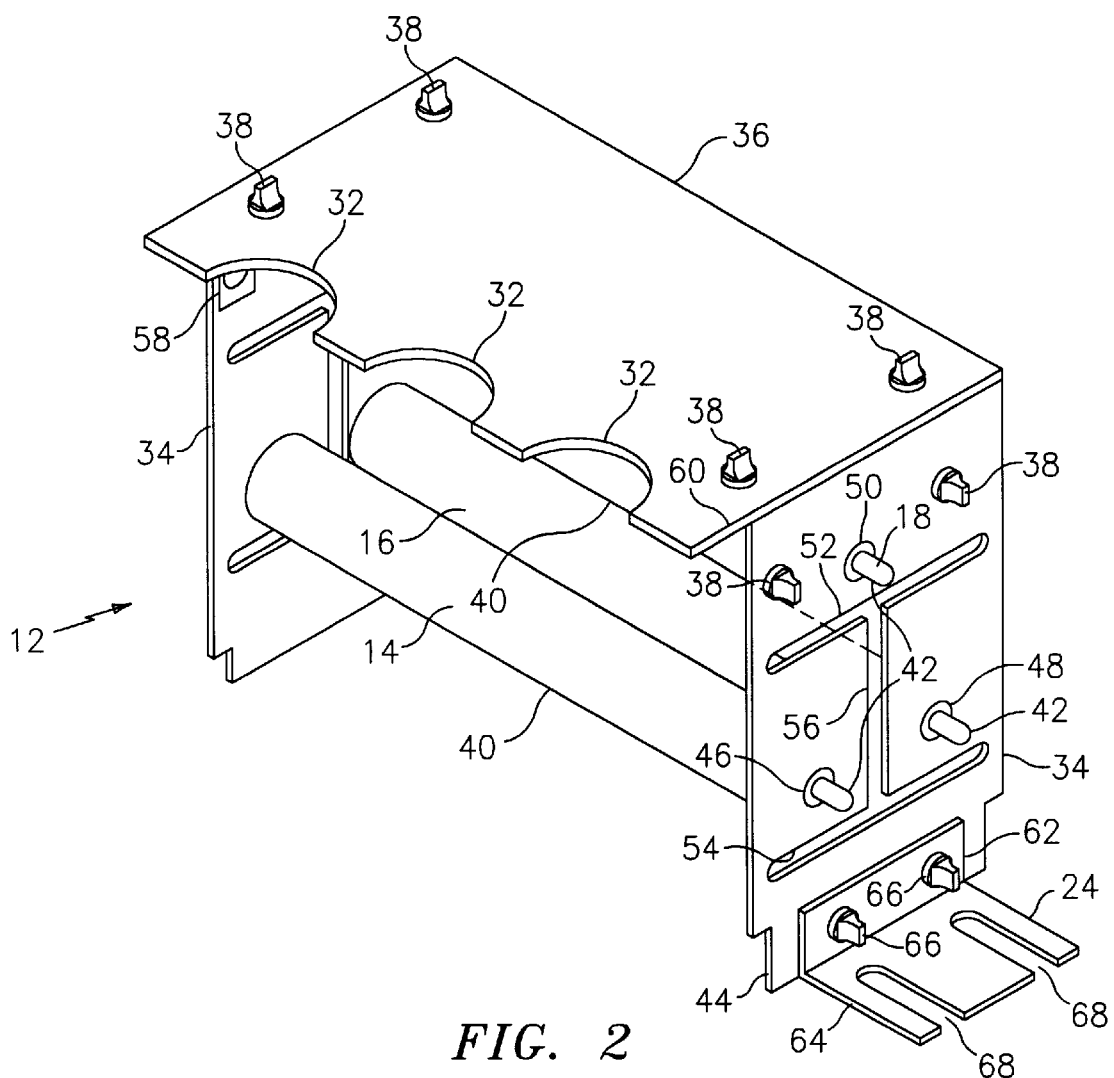
FIG. 2 is a perspective view of the fuse holder of FIG. 1.

Referring to FIG. 2, an exemplary embodiment of a fully assembled fuse holder 12 of the present invention is shown generally. Fuse holder 12 comprises a pair of end plates 34, a top plate 36 bolted to the end plates 34 with a plurality of bolts 38, and the pair of mounting brackets 24.

End plates 34 are formed of a polymer material that is both electrically insulative and compatible with oils used to cool the distribution transformer 22. End plates 34 are generally rectangular in shape, and include a narrow rectangular base 44 extending downwardly from the lower end of end plates 34. End plates 34 further include circular through holes 46, 48 and 50. Through holes 46 and 48 are approximately located on the horizontal centerline of the end plates 34, and to the left and right side respectively of the vertical centerline. Through hole 50 is located approximately on the upper end of the vertical centerline of the end plates 34. Circular through holes 46, 48 and 50 are sized to receive and secure the distal ends 42 of fuses 14, 16, and 18, and to prevent the fuses' body diameters 40 from extending through.

End plates 34 also include an upper horizontal relief cut 52, a lower horizontal relief cut 54, and a vertical relief cut 56. The vertical relief cut 56 extends approximately along the vertical centerline of end plates 34 and connects with relief cuts 52 and 54 to form a generally I-shaped slot. Upper horizontal relief cut 52 extends horizontally above holes 46 and 48, and below hole 50 to isolate the through hole 50 from through holes 46 and 48. Lower horizontal relief cut 54 isolates through holes 46 and 48 from the base 44 by extending horizontally above the base 44, and below holes 46 and 48. Vertical relief cut 56 isolates through holes 46 and 48 from each other by extending vertically between them.

Top plate 36 is generally rectangular in shape and is attached to the upper distal ends of end pates 34 via bolts 38 and a plurality of brackets 58. Top plate 20 includes a cantilevered section 60, which horizontally projects over the end plates 34. Top plate 20 also includes three semi circular wire routing openings 32 that are equally spaced along the edge of the unsupported length of the cantilevered section 60. Openings 32 are sized to receive and support wire bundles 26, 28, and 30 respectively to prevent contact with the fuses.

Mounting brackets 24 are generally L-shaped and include a vertical section 62 and a horizontal section 64. The vertical section 62 is bolted to the base 44 of end plates 34 via bolts 66. The horizontal section 64 includes a pair of mounting slots 68 that extend outwardly to the edge of the horizontal section 64. Mounting brackets 24 are utilized to attach, e.g., bolt, the fuse holder 12 to the top clamps of the interior clamping assemblies 20 of the distribution transformer 22.

The fuse holder 12 requires fewer parts and is more compact than prior art fuse holders. Additionally, the fuse holder 12 can support many different varieties of fuses, e.g., over current protection fuses, current limiting fuses, and energy limiting fuses. Therefore a few embodiments of the present invention can replace many different variations of prior art fuse holders.

Utilizing relief cuts 52, 54 and 56 to isolate holes 26, 28 and 30 enables fuse holder 12 to obtain an acceptable electrical surface creep distance. Relief cuts 52, 54 and 56 provide an insulation barrier to any creep current conducting between threaded distal ends 42 of fuses 14, 16, and 18. Therefore, the creep distance through which a creep current will conduct must include the distance around the relief cuts 52, 54, and 56 which isolate the ends of the fuses rather than the shortest distance between the fuses. This allows the fuses to be mounted more closely together on end plates 34 and results in a more compact design of fuse holder 12. Even though this embodiment shows the three relief cuts 52, 54 and 56 it will be appreciated by one skilled in the art that any number of relief cuts can be utilized to provide sufficient isolation for any number of fuses on the vertical plates.

The wire routing openings 32 serve as an aide during wire routing by receiving and supporting wire bundles 26, 28 and 30. Therefore, wire routing around the fuse holder is facilitated within the limited space available. Even though this embodiment shows three wire routing openings 32 it will be appreciated by one skilled in the art that any number of wire routing openings can be utilized to provide support for any number of wires.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fuse holder for supporting a plurality of fuses for electrical distribution equipment, said fuse holder comprising:

a first end plate attached to a first distal end of said fuses;

a second end plate attached to a second distal end of said fuses, wherein said first and said second distal ends of said fuses penetrating said first and said second end plates respectively; and said each first and second end plates having a relief cut substantially separating said distal ends of said fuses attached to said first and second end plates.

2. The fuse holder of claim 1 further comprising a top plate attached to said first and second end plates.

3. The fuse holder of claim 1, wherein said top plate includes a wire routing opening to retain a plurality of wires of said electrical distribution equipment.

4. The fuse holder of claim 1, wherein said relief cut is I-shaped.

5. The fuse holder of claim 1, wherein said end plates comprise electrically non-conductive material.

6. The fuser holder of claim 1 wherein said distribution equipment further comprises a distribution transformer.

7. The fuse holder of claim 6, wherein said first and second end plates are attached to a top clamp of an interior clamping assembly of said distribution transformer.

8. The fuse holder of claim 1, wherein said plurality of fuses further comprises a plurality of a current protection fuses, current limiting fuses or energy limiting fuses.

9. The fuse holder of claim 3, wherein said wire routing opening is located along a cantilevered edge of said top plate, said wire routing opening further comprising a plurality of openings.

10. The fuse holder of claim 2, wherein said top plate comprises an electrically non-conductive material.

* * * * *